US012101647B2

(12) United States Patent
Akl et al.

(10) Patent No.: US 12,101,647 B2
(45) Date of Patent: Sep. 24, 2024

(54) DELAYED DELIVERY OF RECONFIGURATION MESSAGE IN INTEGRATED ACCESS AND BACKHAUL (IAB) NETWORK

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 17/317,814

(22) Filed: May 11, 2021

(65) Prior Publication Data

US 2021/0360439 A1 Nov. 18, 2021

Related U.S. Application Data

(60) Provisional application No. 63/023,714, filed on May 12, 2020.

(51) Int. Cl.
*H04W 24/02* (2009.01)
*H04W 24/04* (2009.01)
(Continued)

(52) U.S. Cl.
CPC ........... *H04W 24/02* (2013.01); *H04W 24/04* (2013.01); *H04W 40/22* (2013.01); *H04W 48/10* (2013.01);
(Continued)

(58) Field of Classification Search
None
See application file for complete search history.

(56) References Cited

U.S. PATENT DOCUMENTS

| 2014/0016617 A1* | 1/2014 | Froberg | H04W 36/20 370/331 |
| 2021/0058826 A1 | 2/2021 | Mao et al. | |

(Continued)

FOREIGN PATENT DOCUMENTS

| WO | 2020166912 A1 | 8/2020 |
| WO | 2020191768 A1 | 10/2020 |

(Continued)

OTHER PUBLICATIONS

Author Unknown, TP for NR_IAB BL CR for TS 38.401): IAB-node migration in EN-DC, pp. 1-3, Apr. 30 (Year: 2020).*
(Continued)

*Primary Examiner* — Christopher M Crutchfield
(74) *Attorney, Agent, or Firm* — Arun Swain

(57) ABSTRACT

A method of wireless communication by an integrated access and backhaul network (IAB) donor transmits a configuration message on a source path to a first IAB node via a first distributed unit of the IAB donor. The method also instructs the first IAB node to delay delivery of the configuration message to a second node. The method migrates at least part of communications to the first IAB node from the source path to a target path via a second distributed unit. Another method of wireless communication is executed by a first integrated access and backhaul network (IAB) node. The method receives a first configuration message over a source path to a first IAB donor via a first distributed unit of the first IAB donor. The method also delays delivery of the first configuration message to a second node until a trigger occurs.

61 Claims, 12 Drawing Sheets

(51) Int. Cl.
  *H04W 40/22* (2009.01)
  *H04W 48/10* (2009.01)
  *H04W 74/0833* (2024.01)
  *H04W 76/10* (2018.01)
  *H04W 84/04* (2009.01)
  *H04W 12/0471* (2021.01)

(52) U.S. Cl.
  CPC ....... *H04W 74/0833* (2013.01); *H04W 76/10* (2018.02); *H04W 84/047* (2013.01); *H04W 12/0471* (2021.01)

(56) References Cited

U.S. PATENT DOCUMENTS

| | | | | |
|---|---|---|---|---|
| 2021/0235291 | A1* | 7/2021 | Byun | H04W 28/0236 |
| 2022/0264413 | A1* | 8/2022 | Fujishiro | H04W 76/20 |
| 2022/0322464 | A1* | 10/2022 | Luo | H04W 76/11 |
| 2022/0369177 | A1* | 11/2022 | Cao | H04W 36/0055 |

FOREIGN PATENT DOCUMENTS

| | | | |
|---|---|---|---|
| WO | 2020194271 | A1 | 10/2020 |
| WO | 2021032905 | A1 | 2/2021 |

OTHER PUBLICATIONS

Author Unknown, Report email discussion [Post109e#36][IAB] RLF Handling Open Issues, pp. 1-29, Apr. 20 (Year: 2020).*

International Search Report and Written Opinion—PCT/US2021/032051—ISA/EPO—Aug. 20, 2021.

Qualcomm Incorporated: "Interruption Time Reduction for Intra-Donor TAB-Node Migration", 3GPP Drait, 3GPP TSG-RAN WG3 Meeting #112-e, R3-211740, 3rd Generation Partnership Project (3GPP), Mobile Competence Centre, 650, Route Des Lucioles, F-06921 Sophia-Antipolis Cedex, France, vol. RAN WG3, No. E-Meeting, May 17, 2021-May 28, 2021 May 6, 2021 (May 6, 2021), XP052001441, pp. 1-8.

ZTE, et al., "(TP for NR_TAB BL CR for TS 38.401): Intra-CU Topology Adaptation Procedure", 3GPP Draft, 3GPP TSG-RAN WG3 #107bis-e, R3-202751, 3rd Generation Partnership Project (3GPP), Mobile Competence Centre, 650, Route Des Lucioles, F-06921, Sophia-Antipolis Cedex, France, vol. RAN WG3, No. Online, Apr. 20, 2020-Apr. 30, 2020 May 4, 2020 (May 4, 2020), XP051880944, 4 Pages.

Qualcomm Incorporated: "Support for NR IAB", S2-1907203 (was S2-190xxxx), SA WG2 Meeting #134, Sapparo, Japan, USA, Jun. 24-28, 2019, pp. 1-8.

* cited by examiner

DELAYED DELIVERY OF RECONFIGURATION MESSAGE IN INTEGRATED ACCESS AND BACKHAUL (IAB) NETWORK

CROSS-REFERENCE TO RELATED APPLICATION

The present application claims the benefit of U.S. Provisional Patent Application No. 63/023,714, filed on May 12, 2020, and titled "DELAYED DELIVERY OF RECONFIGURATION MESSAGE IN INTEGRATED ACCESS AND BACKHAUL (IAB) NETWORK," the disclosure of which is expressly incorporated by reference in its entirety.

FIELD OF THE DISCLOSURE

Aspects of the present disclosure generally relate to wireless communications, and more particularly to techniques and apparatuses for delayed delivery of reconfiguration messages in integrated access and backhaul (IAB) networks.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipments (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

The present disclosure is set forth in the independent claims, respectively. Some aspects of the disclosure are described in the dependent claims.

According to an aspect of the present disclosure, a method of wireless communication by an integrated access and backhaul network (IAB) donor transmits a configuration message on a source path with a first IAB node via a first distributed unit of the IAB donor. The method also instructs the first IAB node to delay delivery of the configuration message to a second node. The method migrates at least part of communications to the first IAB node from the source path to a target path via a second distributed unit.

In another aspect, a method of wireless communication is executed by a first integrated access and backhaul network (IAB) node. The method receives a first configuration message over a source path with a first IAB donor via a first distributed unit of the first IAB donor. The method also delays delivery of the first configuration message to a second node until a trigger occurs, at which time the message is delivered.

In another aspect of the present disclosure, an apparatus for wireless communications by an integrated access and backhaul network (IAB) donor includes a processor, and a memory coupled with the processor. Instructions stored in the memory are operable, when executed by the processor, to cause the apparatus to transmit a configuration message on a source path with a first IAB node via a first distributed unit of the IAB donor. The apparatus can also instruct the first IAB node to delay delivery of the configuration message to a second node. The apparatus can also migrate at least part of communications to the first IAB node from the source path to a target path via a second distributed unit.

In another aspect of the present disclosure, an apparatus for wireless communications by a first integrated access and backhaul network (IAB) node includes a processor, and memory coupled with the processor. Instructions stored in the memory are operable, when executed by the processor, to cause the apparatus to receive a first configuration message over a source path with a first IAB donor via a first distributed unit of the first IAB donor. The apparatus can also delay delivery of the first configuration message to a second node. The apparatus can also deliver the first configuration message to the second node in response to a trigger.

In another aspect of the present disclosure, an integrated access and backhaul network (IAB) donor for wireless communication includes means for transmitting a configuration message on a source path with a first IAB node via a first distributed unit of the IAB donor. The IAB donor also includes means for instructing the first IAB node to delay delivery of the configuration message to a second node. The IAB donor also includes means for migrating at least part of communications to the first IAB node from the source path to a target path via a second distributed unit.

In another aspect of the present disclosure, a first integrated access and backhaul network (IAB) node for wireless communication includes means for receiving a first configuration message over a source path with a first IAB donor via a first distributed unit of the first IAB donor. The IAB node also includes means for delaying delivery of the first configuration message to a second node until a trigger occurs, at which time the message is delivered.

In yet another aspect of the present disclosure, a non-transitory computer-readable medium with program code recorded thereon is disclosed. The program code is executed by an integrated access and backhaul network (IAB) donor and includes program code to transmit a configuration message on a source path with a first IAB node via a first distributed unit of the IAB donor. The IAB donor also includes program code to instruct the first IAB node to delay delivery of the configuration message to a second node. The IAB donor also includes program code to migrate at least part of communications to the first IAB node from the source path to a target path via a second distributed unit.

In still another aspect of the present disclosure, a non-transitory computer-readable medium with program code recorded thereon is disclosed. The program code is executed by a first integrated access and backhaul network (IAB) node and includes program code to receive a first configuration message over a source path with a first IAB donor via a first distributed unit of the first IAB donor. The IAB node also includes program code to delay delivery of the first configuration message to a second node until a trigger occurs, at which time the message is delivered.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
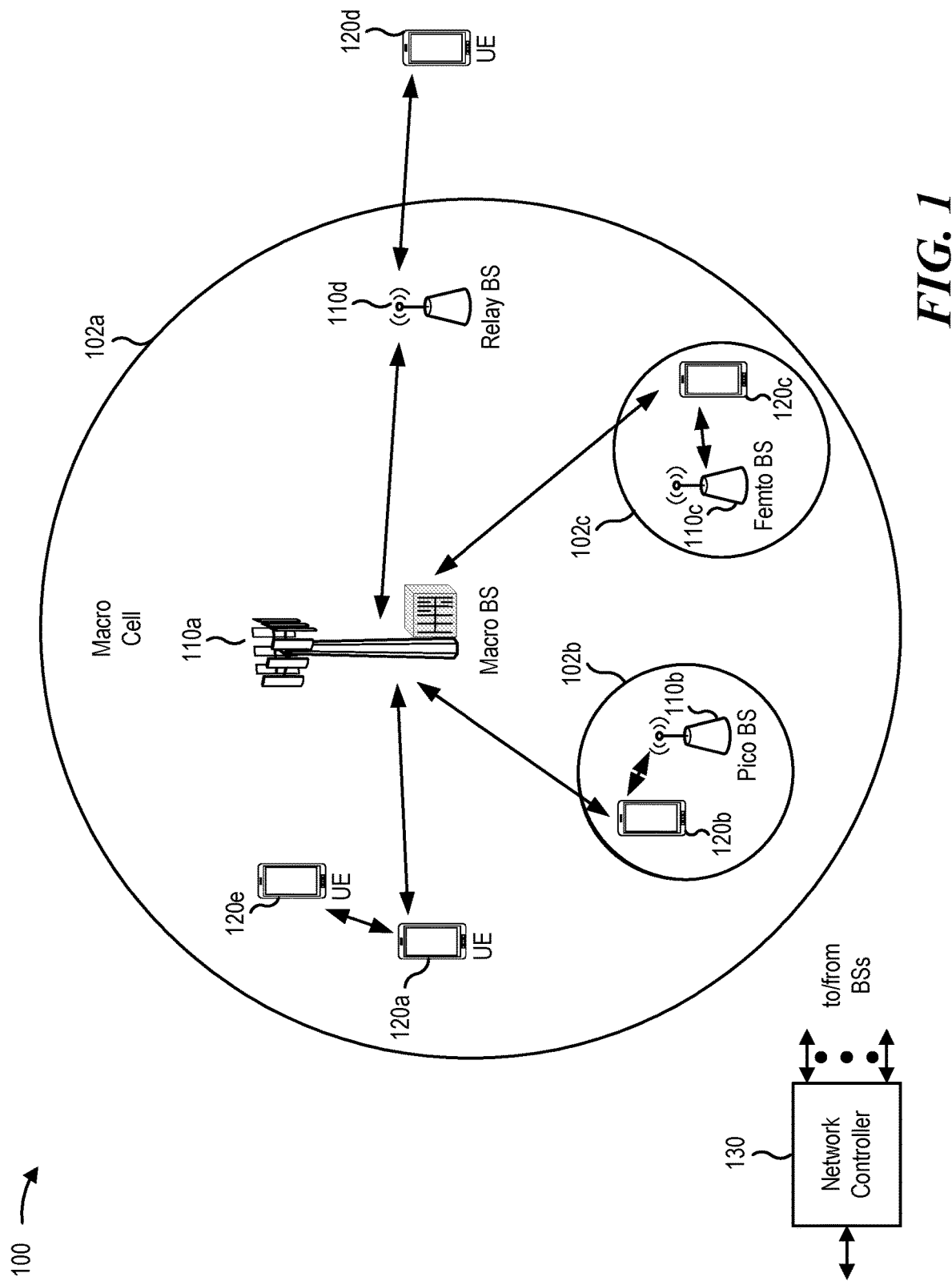
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

5G new radio (NR) deployments can take advantage of high frequencies, such as millimeter wave. While the high frequencies are promising due to a higher bandwidth in comparison to low frequencies, these higher frequencies have a shorter range in comparison to lower frequencies. Consequently, a denser placement of base stations is specified for the high frequencies. Fiber backhaul links between the base stations are expensive, and a denser placement of the base stations will significantly increase costs. Thus, replacing the backhaul links with wireless links is an attractive solution that addresses the economics of denser base station deployment. Integrated access and backhaul (IAB) networks present a solution that includes wireless resources for part of the backhaul network.

In topology adaptation, a migration of an IAB node to a different donor distributed unit (DU) triggers security handshakes at descendant nodes. The migration may, for example, be to address a drop in signal quality (e.g., radio link failure), in response to movement of a migrating IAB node that is moving to a new region, or for load balancing purposes. In conventional approaches, security handshakes occur sequentially, which slows down the topology adaptation procedure and results in dropped packets and reduced performance.

According to aspects of the present disclosure, a centralized unit (CU) indicates to an IAB node DU to delay the delivery of radio resource control (RRC) reconfiguration messages. This delay allows the sending of configuration messages on a source path to the IAB node, instead of a target path. The delay enables concurrent execution of security handshakes on the target path.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
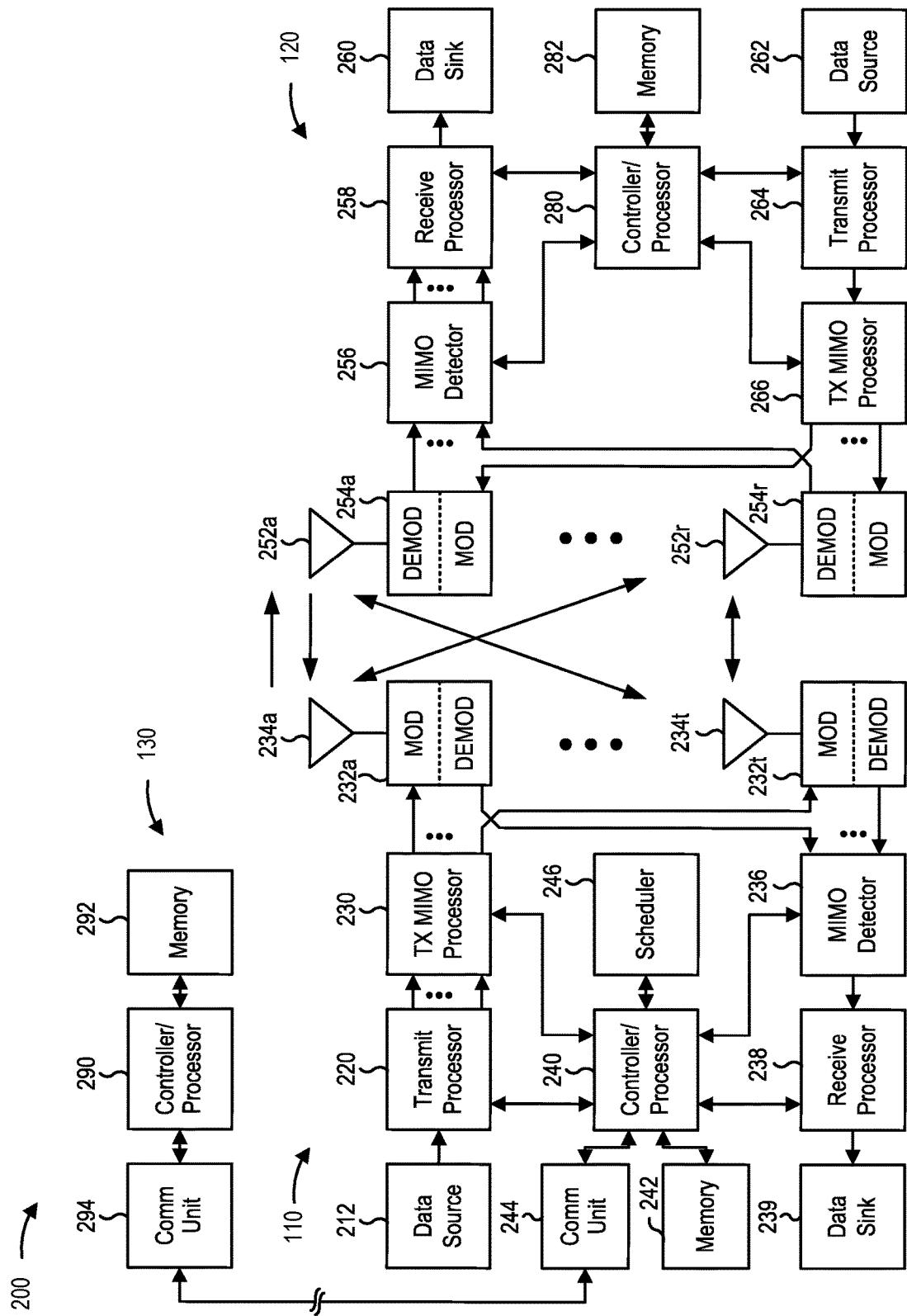
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate), the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. A scheduler 246 may schedule UEs for data transmission on the downlink and/or uplink. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with delayed message delivery, as described in more detail elsewhere. For example, the controller/processor 240 of the base station 110, the controller/processor 280 of the UE 120, and/or any other component(s) of FIG. 2 may perform or direct operations of, for example, the processes of FIGS. 10-12 and/or other processes as described. Memories 242 and 282 may store data and program codes for the base station 110 and UE 120, respectively.

In some aspects, the network controller 130 may include means for receiving, means for transmitting, means for instructing, means for migrating, means for performing, means for configuring, means for sending, means for delaying, means for delivering, means for detecting, means for executing, means for initiating, and means for participating. Such means may include one or more components of the network controller 130 described in connection with FIG. 2.

As indicated above, FIG. 2 is provided merely as an example. Other examples may differ from what is described with regard to FIG. 2.

5G new radio (NR) deployments can take advantage of high frequencies, such as millimeter wave. While the high frequencies are promising due to a higher bandwidth in comparison to low frequencies, these higher frequencies have a shorter range in comparison to lower frequencies. Consequently, a denser placement of base stations is specified for the high frequencies. Fiber backhaul links between the base stations are expensive, and a denser placement of the base station will significantly increase costs. Thus, replacing the backhaul links with wireless links is an attractive solution that addresses the economics of denser base station deployment. Integrated access and backhaul (IAB) networks present a solution that includes wireless resources for part of the backhaul network.

Figure 3:
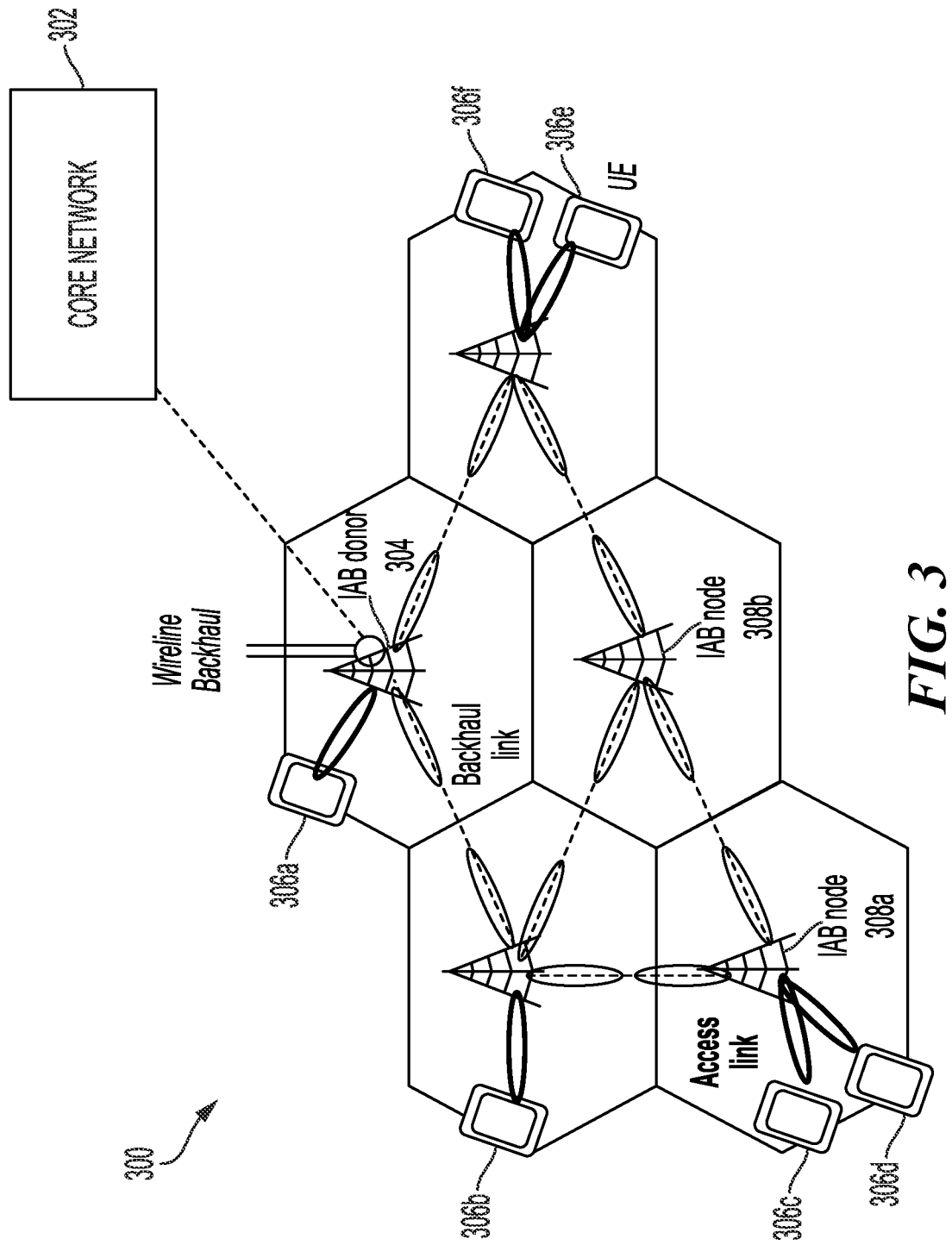
FIG. 3 is a block diagram illustrating an integrated access and backhaul (IAB) network, in accordance with aspects of the present disclosure.

5G NR technologies, such as millimeter wave (mmWave), can support access networks between access nodes (ANs, e.g., base stations) and UEs, as well as backhaul networks between ANs. FIG. 3 is a block diagram illustrating an integrated access and backhaul (IAB) network 300, in accordance with aspects of the present disclosure. An integrated access and backhaul (IAB) donor (e.g., 304) is an access node with a wireline connection to the core network 302. An IAB node (e.g., 308) is an access node that relays traffic to and from a donor through one or more hops. A UE (e.g., 306a-f) can communicate with an IAB node via an access link or with an IAB donor via an access link. IAB networks share resources between the access and backhaul networks. In IAB networks, it is desirable to reuse a framework for an access network as much as possible.

Figure 4:
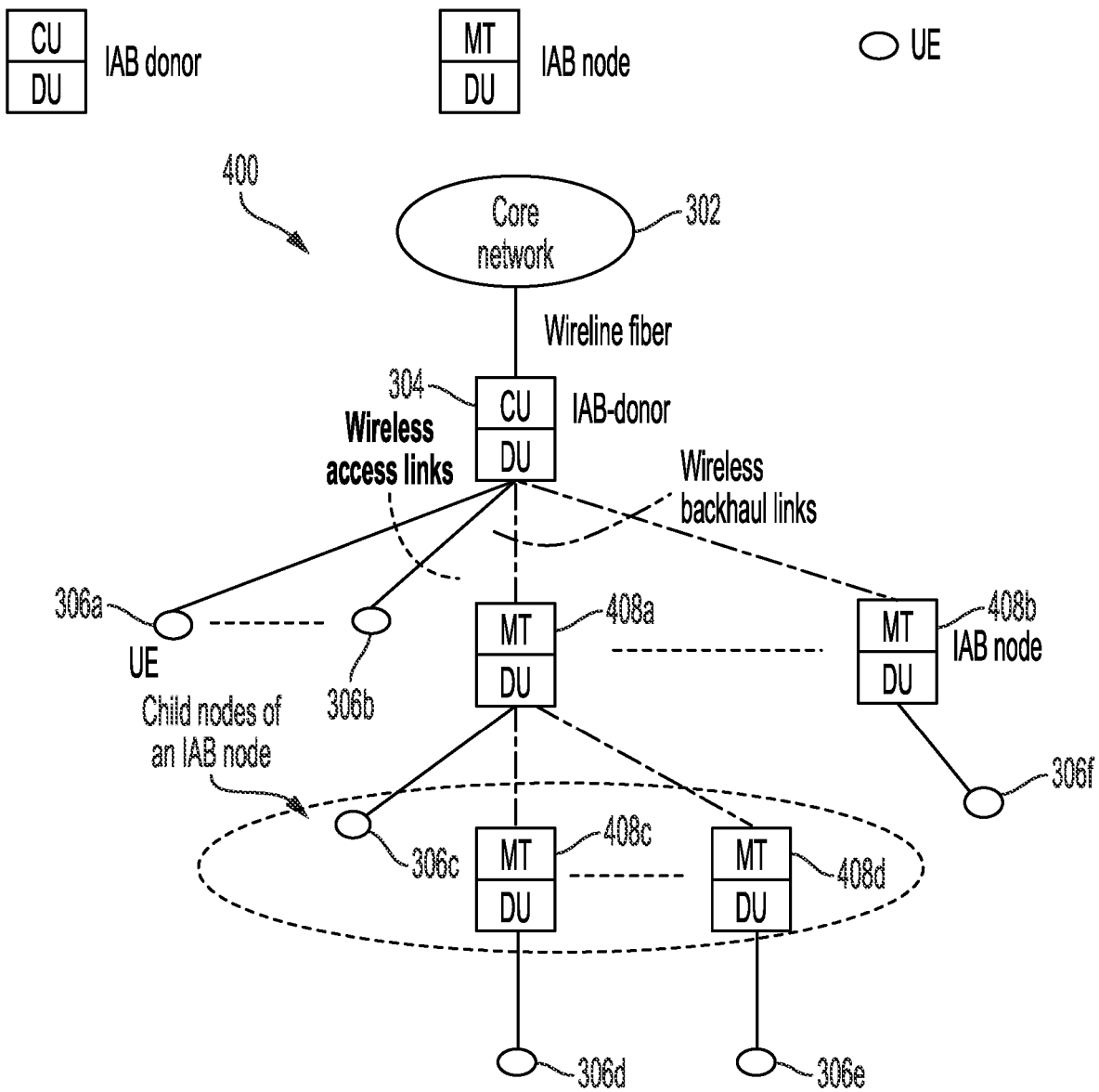
FIG. 4 is a block diagram illustrating a more detailed view of the integrated access and backhaul (IAB) network shown in FIG. 3, in accordance with aspects of the present disclosure.

FIG. 4 is a block diagram 400 illustrating a more detailed view of the integrated access and backhaul (IAB) network shown in FIG. 3, in accordance with aspects of the present disclosure. An IAB donor (e.g., 304) is an enhanced gNB node with functions to control an IAB network. A central unit (CU) is the central entity that controls the entire IAB network through configuration of the IAB donor (e.g., 304) and IAB nodes (e.g., 408a-d). The CU performs radio resource control (RRC)/packet data convergence protocol (PDCP) layer functions. A distributed unit (DU) of the IAB donor (e.g., 304) or an IAB node (e.g., 408a-d) is a scheduling unit that schedules child nodes (e.g., 408a-d) of the IAB donor (e.g., 304) or the IAB node (e.g., 408a-d), respectively. The DU handles radio link control (RLC)/medium access control (MAC)/physical (PHY) layer functions.

An IAB node (e.g., 408a) is a layer 2 (L2) relay node including mobile termination (MT) and DU functions. An MT unit is a scheduled unit similar to a user equipment (UE) scheduled by its parent IAB node or IAB donor 304. A DU of the IAB node (e.g., 304) is a scheduling unit that schedules child nodes of the IAB node.

Figure 5:
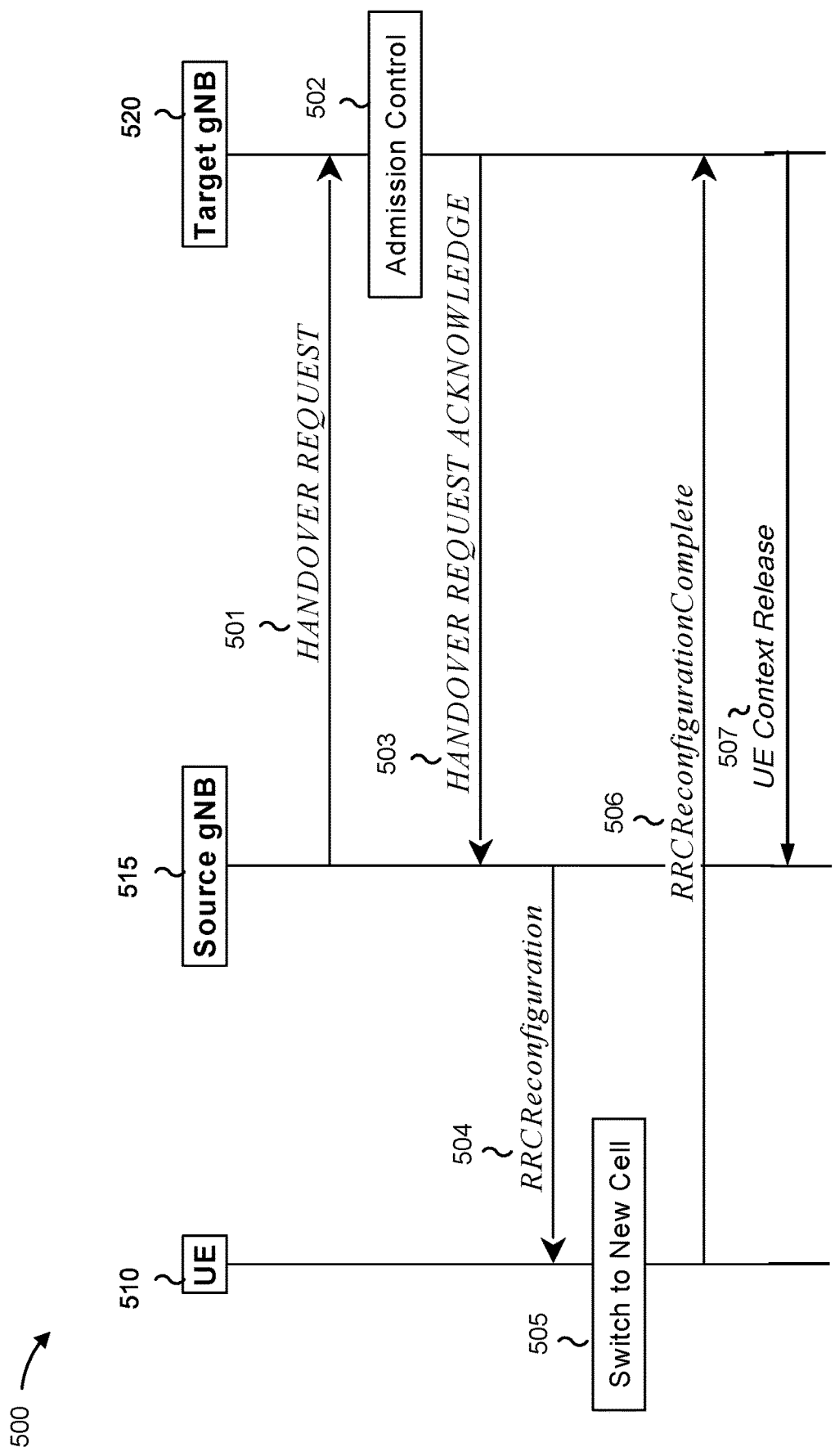
FIG. 5 is a timing diagram illustrating a user equipment (UE) inter-base station handover, in accordance with aspects of the present disclosure.

FIG. 5 is a timing diagram 500 illustrating a user equipment (UE) inter-base station handover, in accordance with aspects of the present disclosure. FIG. 5 shows a simplified UE inter-base station handover from a source base station (currently serving the UE) to a target base station (as the new serving base station). At time 501, a source base station (e.g., source gNB 515) initiates a handover and issues a HANDOVER REQUEST over an Xn interface to a target gNB 520. At time 502, the target gNB 520 performs admission control. For example, the target gNB 520 determines if enough resources are available to serve a UE 510. If so, at time 503 the target gNB 520 provides the source gNB 515 with a new RRC configuration as part of the HANDOVER REQUEST ACKNOWLEDGE message.

At time 504, the source gNB 515 provides the RRC configuration to the UE 510 by forwarding an RRCReconfiguration message received in the HANDOVER REQUEST ACKNOWLEDGE message. At time 505, the UE 510 moves the RRC connection to the target gNB 520 (e.g., by performing a random access procedure with the target gNB) and at time 506, replies to the target gNB 520 with an RRCReconfigurationComplete message. At time 507, the target gNB 520 sends the UE 510 a UE CONTEXT RELEASE message to inform the source gNB 515 about the success of the handover. Accordingly, the source gNB 515 can release resources that were allocated to the UE 510.

Figure 6:
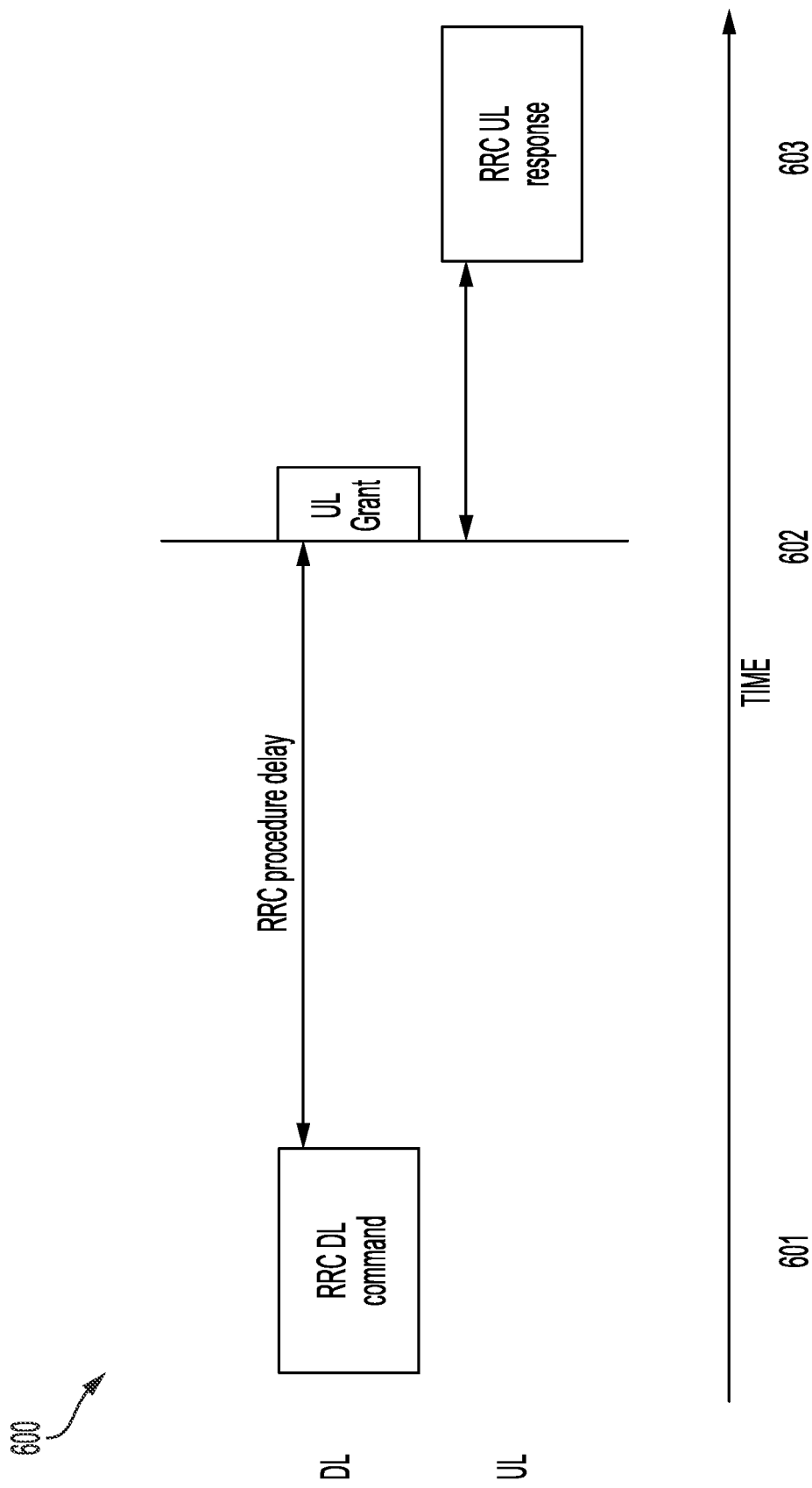
FIG. 6 is a block diagram illustrating delay specifications for radio resource control (RRC) procedures, in accordance with aspects of the present disclosure.

FIG. 6 is a block diagram 600 illustrating delay specifications for radio resource control (RRC) procedures, in accordance with aspects of the present disclosure. For RRC procedures, a UE (e.g., 306c shown in FIG. 3) receives an RRC downlink (DL) command, at time 601. At time 602, the UE receives an uplink grant for transmission of the RRC uplink (UL) response, which occurs at time 603. According to 3GPP standards, the time from receiving the RRC downlink (DL) command on the UE physical layer up to when the UE shall be ready for the reception of the uplink grant for the UE to respond to the network messages is limited to 10 ms for RRC reconfiguration. This delay can also include time for transmission time interval (TTI) alignment.

When the UE receives an RRC message implying handover, the UE will be ready to start the transmission of the new uplink physical random access channel (PRACH) within $D_{handover}$ ms from the end of the last TTI containing the RRC command. The time $D_{handover}$ may be defined as:

$$D_{handover} = \text{RRC procedure delay} + \text{interruption time} (T\text{interrupt})$$

$$T\text{interrupt} = T\text{search} + TIU + T\text{processing} + T\Delta + T\text{margin ms},$$

where Tsearch is the time specified to search the target cell, Tprocessing is the time for UE processing, Tmargin is the time for synchronization signal block (SSB) post-processing, TΔ is the time for fine tuning tracking and acquiring full timing information of the target cell, and TIU is the interruption uncertainty in acquiring the first available PRACH occasion in the new cell.

Figure 7:
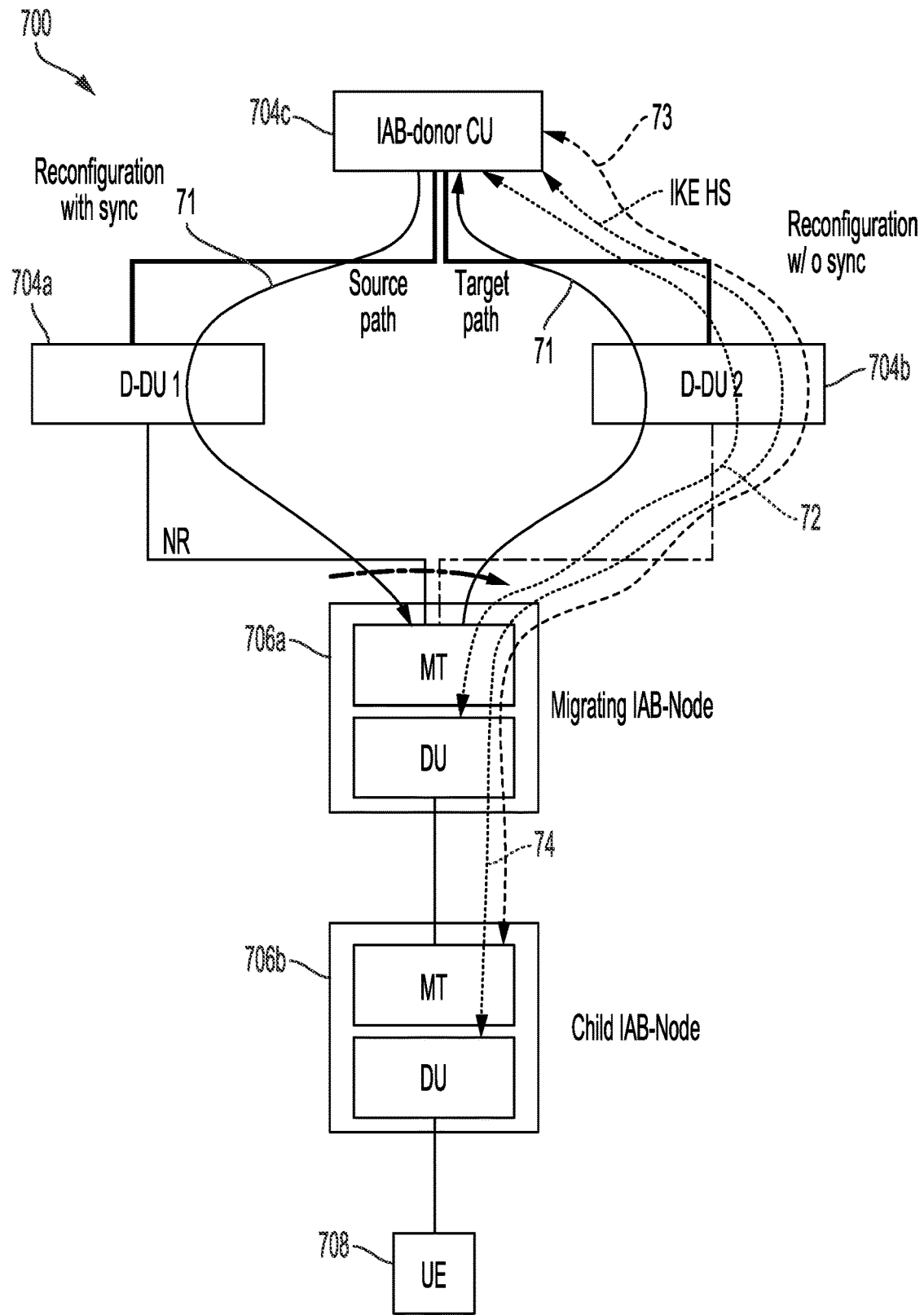
FIG. 7 is a block diagram illustrating intra-central unit (CU) migration via handover, in accordance with aspects of the present disclosure.
Figure 8:
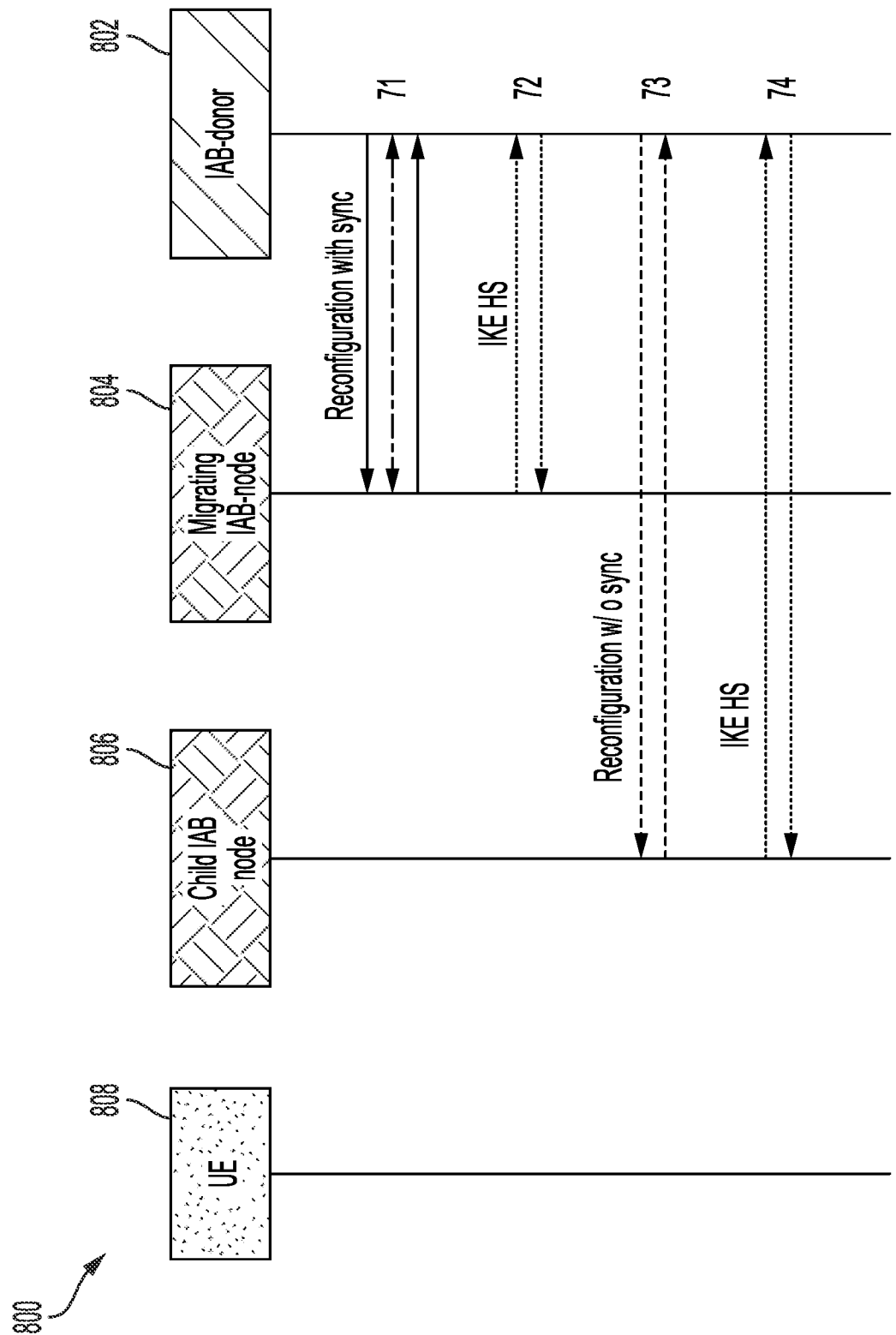
FIG. 8 is a timing diagram illustrating intra-central unit (CU) migration via handover, in accordance with aspects of the present disclosure.

FIG. 7 is a block diagram 700 illustrating an example intra-central unit (CU) migration via handover, in accordance with aspects of the present disclosure. FIG. 8 is a timing diagram 800 illustrating intra-central unit (CU) migration via handover, in accordance with aspects of the present disclosure.

In some aspects of the present disclosure, the example shown in FIGS. 7 and 8 may refer to a topology adaptation where an IAB node 706a (more specifically, its MT function) migrates (in similar manner as the handover procedure for a UE described with reference to FIG. 5) from a source parent node to a target parent node. In the example shown in FIG. 7, the source parent node 704a and the target parent node 704b are distributed units D-DU 1 and D-DU 2 of the same IAB donor 704 shown in FIG. 8. Communications via the source D-DU 1 occur over the source path as shown in FIG. 7 while communications via the target D-DU 2 occur over the target path. FIGS. 7 and 8 show the example of a migration of an IAB node 706a directly connected to a distributed unit of the IAB donor 704. In some examples, the migrating IAB node may be a child IAB node of another (parent) IAB node which in turn is directly or indirectly connected to a distributed unit D-DU 1 of the IAB donor 704. Migration of the child IAB node may then involve migrating (the connection) of an MT function of the child IAB node from the source parent IAB node to a target parent IAB node which is directly or indirectly connected to a different distributed unit D-DU 2 of the IAB donor 704. In other words, migrating an IAB node may involve directly or indirectly (i.e., via one or more intermediate IAB nodes) reconnecting/handing over the MT function of the IAB node to a different DU of the IAB donor 704.

Referring to FIGS. 7 and 8, as seen at time 71, an IAB donor 704 begins a reconfiguration with a synchronization procedure by sending an RRC reconfiguration message to a migrating IAB node 706a. The RRC reconfiguration message for an IAB node MT carries a new IP address for the migrating IAB node 706a. An IAB node's IP information used by the DU of the IAB node may be derived from an IP prefix owned by the donor DU so that traffic to/from the IAB node is routable via that donor DU. Thus, if the donor DU changes as shown in FIG. 7, the IP information for the IAB-node will have to change. Similarly, if an IAB node connects to multiple donor DUs then it will be allocated corresponding IP information for each donor DU.

As seen in FIG. 7, the IAB node 706a migrates from donor-distributed unit (D-DU) 1 704a to D-DU 2 704b. Thus, in this example, an IP address for D-DU 2 704b is provided via the RRC reconfiguration message from the IAB-donor CU 704c. The RRC reconfiguration may also include an uplink (UL) mapping, indicating a channel for communications with D-DU 2 704b. The initial communications from the IAB donor (e.g., 704a) to the migrating IAB node (e.g., 706a) at time 71 are via a source path. After synchronization, the response (e.g., a RRC Reconfiguration Complete message) traverses the target path (also shown at time 71). It is noted that the handover may take a period of time. Thus, time 71 refers to that period of time.

In response to receiving the new IP address in the RRC reconfiguration message, at time 72, a security handshake (e.g., an internet key exchange (IKE) handshake) occurs between the IAB donor (e.g., via the target DU 704b) and the migrating IAB node (e.g., 706a). More specifically, the IAB node (e.g., 706a) DU sets up a security association on the target path.

The example child IAB node (e.g., 706b) may also be impacted by the migrating IAB node (e.g., 706a) and thus, should be aware of the new path resulting from the migrating IAB node (e.g., 706a). Accordingly, at time 73, an RRC reconfiguration process occurs with the child IAB node (e.g., 706b). More specifically, the reconfiguration process occurs with the child IAB node (e.g., 706b) MT over the target path. In conventional systems and methods, the security handshake (e.g., the IKE handshake) at the parent IAB node (e.g., 706a) DU occurs prior to the RRC reconfiguration process with the child IAB node (e.g., 706b), as shown in FIGS. 7 and 8. As a result, the security handshakes with the migrating and child IAB nodes (e.g., 706b) occur sequentially over hops. As seen in FIG. 8, the security handshake with the child IAB node 706b occurs at time 74, which is after the security handshake with the migrating IAB node 706a at time 72. Accordingly, in the conventional methods, if the migration occurs (e.g., between time 72 and time 73) when the child IAB node (e.g., 706b) or UE 708 attempt to communicate with the IAB donor CU (e.g., 704c) via an IP address anchored at the target D-DU 2 (e.g., 704b), the packets configured for communicating through D-DU 1 (e.g., 704a) are dropped for security measures.

According to aspects of the present disclosure, a delayed delivery of an RRC reconfiguration message indicates (or may account for) availability of the target path to a child IAB node. By delaying delivery of the reconfiguration message to child IAB nodes, the application of security protocols may be delayed. As a result, security handshakes occur concurrently over hops. As such, dropped packets may be reduced. In another aspect, timers are configured to account for the delayed delivery.

Figure 9:
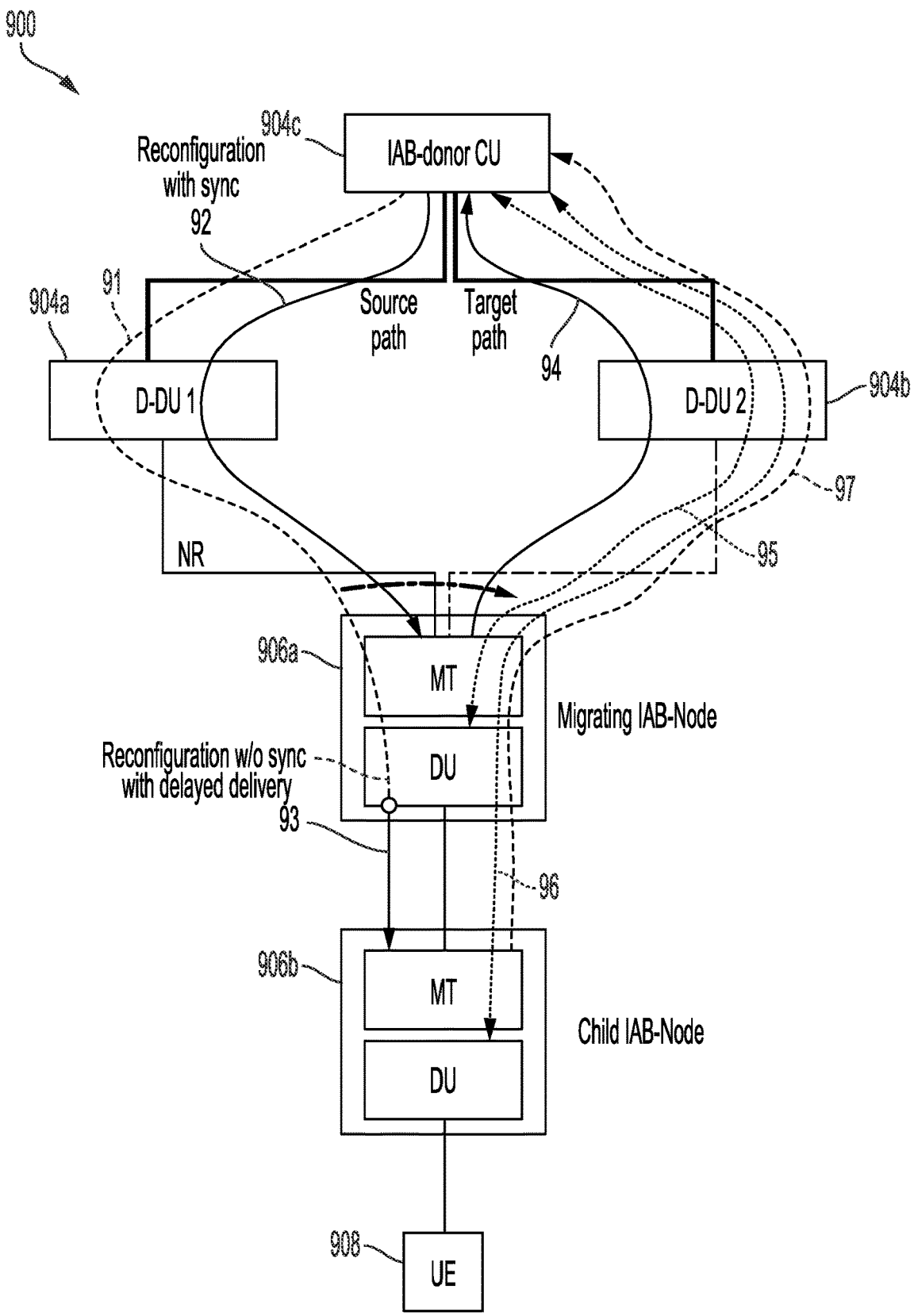
FIG. 9 is a block diagram illustrating intra-central unit (CU) migration via handover with delayed delivery, in accordance with aspects of the present disclosure.
Figure 10:
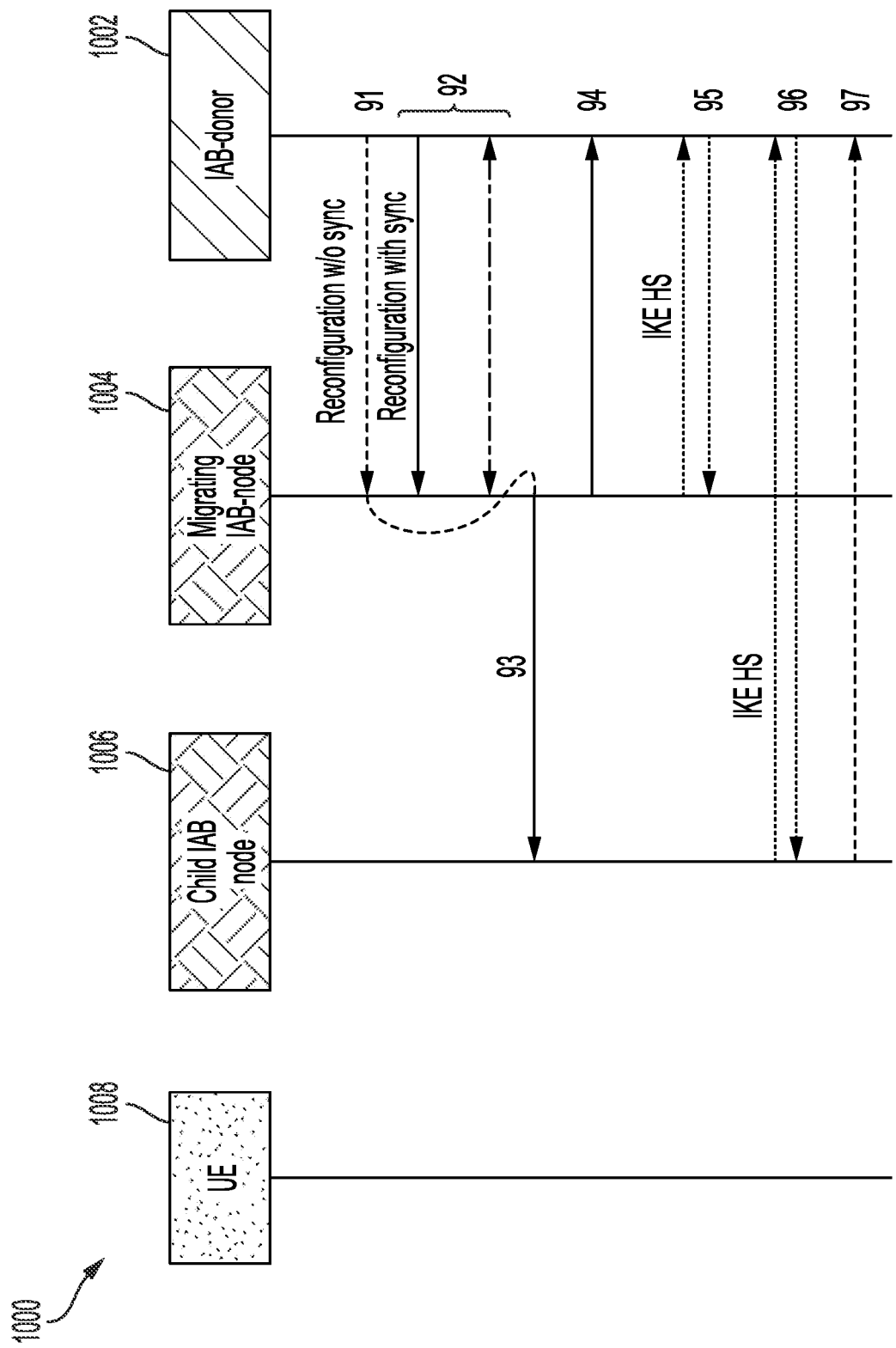
FIG. 10 is a timing diagram illustrating intra-central unit (CU) migration via handover with delayed delivery, in accordance with aspects of the present disclosure.

FIG. 9 is a block diagram 900 illustrating intra-central unit (CU) migration via handover with delayed delivery, in accordance with aspects of the present disclosure. FIG. 10 is a timing diagram 1000 illustrating intra-central unit (CU) migration via handover with delayed delivery, in accordance with aspects of the present disclosure. A first IAB donor (e.g., 904), and in some aspects, a first IAB donor CU 904c, with a first signaling connection (e.g., via the source D-DU 1 904a) to a migrating IAB node (e.g., first IAB node 906a) and a second signaling connection (e.g., via the source D-DU 1 904a) to a child IAB node (e.g., second IAB node 906b) sends a configuration message to the child IAB node (e.g., 906b) on the first path via the first IAB node (e.g., 906a). The first signaling connection may be a connection from the IAB donor CU 904c (via the source D-DU 1 904a) to the MT function of the migrating IAB node 906a. The second signaling connection may be a connection from the IAB donor CU 904c (via the source D-DU 1 904a) directly (e.g., without going through an intermediate IAB node), to the MT function of the child IAB node 906b. To this end, at time 91, the IAB donor (e.g., 904) sends the configuration message to the migrating IAB node (also referred to as the first IAB node) and instructs the migrating IAB node (e.g., 906a) on the first signaling connection (over a source path) to postpone delivery of the configuration message to the child IAB node (e.g., 906b). The first IAB donor CU (e.g., 904c) may instruct the migrating IAB node (e.g., 906a) to postpone delivery (or forwarding in the case of a grandchild or further removed node) of the configuration message based on (or in some aspects, until receiving) a first backhaul adaption protocol (BAP) address, BAP routing ID, backhaul (BH) RLC channel ID, or logical channel ID (LCD).

The migrating IAB node (e.g., 906a) may withhold the configuration message until triggered to release the message at time 93. The first signaling connection may be across an F1-C or RRC interface. The second signaling connection may also be across an F1-C or RRC interface.

At time 92, before release of the configuration message to the child IAB node (e.g., 906b), the IAB donor (904a) starts a synchronized reconfiguration procedure with the migrating IAB node (e.g., 906a). After releasing the configuration message to the child IAB node (e.g., 906b) at time 93, the migrating IAB node (e.g., 906a) completes the reconfiguration process with the IAB donor (e.g., 904b) by sending an RRC Reconfiguration Complete message to the IAB donor CU 904c via the target path (e.g., via D-DU 2 904b) at time 94. Although not shown in FIG. 10, it is noted that sending of the RRC Reconfiguration complete message may occur before time 93. For example, the reconfiguration message may be forwarded to the child IAB node (e.g., 906*b*) or UE 908 upon successful completion of the handover.

As a result of the delay, the IAB donor (e.g., 904*b*) and migrating IAB node (e.g., 906*a*) may execute a security handshake at time 95, which may occur concurrently with the security handshake between the IAB donor (e.g., 904*b*) and the child IAB node (e.g., 906*b*) at time 96. It is noted that there is no time dependency for the two handshakes; thus the security handshakes may occur concurrently. After the security handshake, at time 97 the child IAB node (e.g., 906*b*) sends an RRC reconfiguration complete message to the IAB donor (e.g., 904). Although not shown in FIG. 10, the RRC Reconfiguration Complete message may be sent between time 95 and time 96.

Notably, as described with reference to FIG. 10, the reconfiguration message has already been delivered to the parent (migrating node) at time 91 using the F1 connection on the source path. Therefore, the forwarding of the reconfiguration message to the child IAB node (e.g., 906*b*) at time 93 is not dependent on re-establishing F1 on the target path (e.g., the forwarding of the reconfiguration message is not dependent on the security handshake between the IAB donor (e.g., 904*b*) and migrating IAB node at time 95 that is performed to redirect F1 to the target path). Moreover, releasing the configuration message to the child IAB node (e.g., 906*b*) at time 93 and the security handshake at time 94 are also independent because they correspond to configurations of different nodes (e.g., child IAB node (e.g., 906*b*) and migrating IAB node (e.g., 906*a*)). Thus, in accordance with aspects of the present disclosure, there is no restriction as to the order of executing the processes at timings 93, 94 or 95.

In one example, the security handshake at time 95 may be initiated prior to the process of releasing the configuration message to the child IAB node (e.g., 906*b*) at time 93 is executed. However, there is no restriction that the security handshake between the IAB donor (e.g., 904*b*) and the child IAB node (e.g., 906*b*) at time 96 occur after the security handshake between the IAB donor (e.g., 904*b*) and the migrating IAB node (e.g., 906*a*) at time 95. For instance, the migrating IAB node (e.g., 906*a*) may be ten hops from the IAB donor (e.g., 904*b*). Thus, if the security handshake at time 95 has already started, it may take a time period for the two-way security handshake at time 95 to complete. Accordingly, the process of releasing the configuration message to the child IAB node (e.g., 906*b*) at time 93 may occur and trigger the security handshake between the IAB donor (e.g., 904*b*) and the child IAB node (e.g., 906*b*) at time 96. Both of the security handshakes at time 95 and time 96, respectively, may continue independently through completion.

In contrast, in FIG. 8, for delivery of reconfiguration message at time 73, F1 has to be established and operational towards the parent (migrating node), which also means that the security handshake between the IAB donor (e.g., via the target DU 704*b*) and the migrating IAB node (e.g., 706*a*) at time 72 precedes the process at time 73 because F1 runs on Internet Protocol Security (IPSec). Therefore, the reconfiguration process at the child IAB node (e.g., 706*b*) at time 73 depends on the security handshake between the IAB donor (704*b*) and the migrating IAB node (706*a*) at time 72. Therefore, the security handshake with the child IAB node 706*b* at time 74 (which uses the new configuration provided at time 73) also depends on the security handshake at time 72. Therefore, the processes at time 72 and time 74 are sequential and cannot be performed concurrently.

The configuration message destined for the child IAB node (e.g., 906*b*) can be an RRC reconfiguration message with or without synchronization. The configuration message may carry IP information and backhaul adaptation protocol (BAP) address information for the second IAB node (e.g., child IAB node), as well as uplink mapping information and routing information. In the case of an inter-CU migration (not shown), the configuration message may carry a reconfiguration message of a second donor CU (not shown).

Delivery of the configuration message may trigger multiple procedures at the child IAB node (e.g., 906*b*). For example, the configuration message may trigger a random access procedure, a security handshake, migration of the second signaling connection to a second path, such as the target path via D-DU 2 904*b*, towards the donor CU (e.g., 904*c*), and migration of data tunnels terminated at the child IAB node (e.g., 906*b*) to the second path towards the donor CU (e.g., 904*c*). Moreover, the message may also trigger establishment of an F1-C connection, including establishment of an SCTP (stream control transmission protocol) connection and adding a path to an existing SCTP connection. Setup of F1-U data tunnels may also be triggered.

Although the description refers to a "child" IAB node, a grandchild or a further node is also contemplated. Similarly, the description refers to the MT as a destination, but the configuration message may also be destined for a UE.

The trigger to release the configuration message may be configured by the donor CU (e.g., 904*c*) on the first signaling connection. The instruction to trigger or configuration to trigger may be initiated by a parent of the migrating IAB node (e.g., via a medium access control-control element (MAC-CE) or downlink control information (DCI)).

The instructions to trigger or configuration to trigger may be UE/MT specific or more general. If the trigger or corresponding trigger information is UE/MT specific, the trigger information releases a configuration message of a specific UE/MT. Alternatively, for general trigger information, the configuration message being released is associated with multiple UEs/MTs (e.g., all children of the migrating IAB node).

According to the present disclosure, multiple types of triggers are contemplated. The trigger may be an absolute time, a time elapsed, a relative time with respect to a RACH occasion detected by the migrating IAB node (e.g., 906*a*), a function of a RACH configuration detected by the first IAB node, or an execution of a reconfiguration with synchronization. In other aspects, the trigger may be a reception of an RRC reconfiguration message. For example, the trigger may occur when the migrating IAB node (e.g., 906*a*) receives a reconfiguration message carrying new IP information, BAP address information, or a reconfiguration with synchronization. The migrating IAB node (e.g., 906*a*) deduces a second path to the first donor CU (e.g., 904*c*) (or a second donor CU in case of an inter-CU migration) is now available. This is also true for the child IAB node (e.g., 906*b*), so the migrating IAB node (e.g., 906*a*) releases the configuration message.

In other aspects, the trigger is based on reception of an indication from a parent of the migrating IAB node (e.g., via a MAC-CE or DCI). The trigger may also be in response to detecting a change in a first system information block (SIB1) message broadcast by a parent of the migrating IAB node. The SIB1 message carries a cell identifier, such as an NR cell global identity (NCGI). Thus, the trigger may be detecting a change of a cell ID of a parent.

A condition on a measurement of a PCI (physical cell ID) broadcast by a parent of an IAB node (e.g., the migrating IAB node) may also be a trigger. For example, a parent of the IAB node (e.g., the migrating IAB node) may change the PCI it is broadcasting after migrating to a different CU. In this case, what might trigger the handover at the IAB node (e.g., the migrating IAB node) and release of any message it withholds is being able to detect the new PCI. Thus, the IAB node (e.g., the migrating IAB node) performs measurements on the old PCI and the new PCI on the signals broadcast by the parent node. A condition for the trigger may be that the IAB node (e.g., the migrating IAB node) measuring a channel quality metric (e.g., RSRP (reference signal received power)) measured on the new PCI by the IAB node has exceeded a threshold, or the difference between the measurements corresponding to the new PCI and the old PCI has exceeded a threshold.

The trigger may be a switch or migration of a migrating IAB node (e.g., 906a) DU, as opposed to the parent DU. In this case, the migrating IAB node (e.g., 906a) releases its configuration message, after the migrating IAB node (e.g., 906a) changes its NR global cell identity (NGCI) carried in the SIB1 message broadcast by the migrating IAB node DU.

In other aspects of the present disclosure, a trigger may be an execution of a security handshake for an inter-CU operation. For example, the IAB node (e.g., the migrating IAB node) may only release a configuration message after securing a backhaul connection to the second CU. Other trigger examples for inter-CU procedures include establishment of an F1-C connection, or setup of an F1-U data tunnel. For both intra-CU and inter-CU scenarios, the trigger may be an indication on the first signaling connection.

In aspects of the present disclosure, the migrating IAB node (e.g., 906a) may acknowledge the donor CU's instructions on the first signaling connection. In other aspects, the migrating IAB node (e.g., 906a) may acknowledge to the donor CU (e.g., 904c) the release of the configuration message on the first signaling connection. In still other aspects, the migrating IAB node (e.g., 906a) may indicate to a child IAB node (e.g., 906b) to release a second configuration message upon delivering the original configuration message.

According to aspects of the present disclosure, the donor CU (e.g., 904c) (or parent of the migrating IAB node) may instruct the migrating IAB node (e.g., 906a) to discard the configuration message on the first signaling connection (or via a medium access control-control element (MAC-CE) or downlink control information (DCI)). The instructions to discard may occur in response to a failed switch at an upstream node. For example, if the migrating IAB node (e.g., 906a) migration failed, the child IAB node (e.g., 906b) migration may be cancelled. In other words, no security handshake occurs on the target path because the target path did not get established.

The first donor CU or a second donor CU (in the case of an inter-CU procedure) may configure a timer extension at the donor CU. The timer extension may be a function of the frequency band, e.g., FR1 (frequency range one (sub 6 GHz) or FR2 (frequency range two mmWave)). In other aspects, the first donor CU or the second donor CU may configure a timer extension at the child IAB node to prevent a reconfiguration failure, connection re-establishment, or connection release at the child IAB node (or UE 908). In some aspects, the first or second donor CU may instruct the child IAB node (e.g., 906b) or destination UE 908 to prevent a reconfiguration failure, connection re-establishment, or connection release at the child IAB node (or UE 908). For example, the child IAB node MT is permitted to send an RRC reconfiguration complete message after executing a security handshake. Finally, upon release of the configuration message, the migrating IAB node (e.g., 906a), child IAB node (e.g., 906b), or any intermediate nodes on the first path may initiate concurrent procedures towards the first donor CU or a second donor CU (e.g., security handshakes).

In some aspects, the child IAB node may sends the RRC reconfiguration complete message to the IAB donor (e.g., 904) at time 97 within the original (regular) timer, whether before or together with the security handshake between the IAB donor (e.g., 904b) and the child IAB node (e.g., 906b) at time 96. As such, the timer extension at the child IAB node may not be used. If the security handshake between the IAB donor (e.g., 904b) and migrating IAB node (e.g., 906a) at time 95 has not been executed yet, the response message may be buffered at the parent and forwarded later. However, such does not prevent performing security handshakes at time 95 and time 96 concurrently.

As indicated above, FIGS. 3-10 are provided as examples. Other examples may differ from what is described with respect to FIGS. 3-10.

Figure 11:
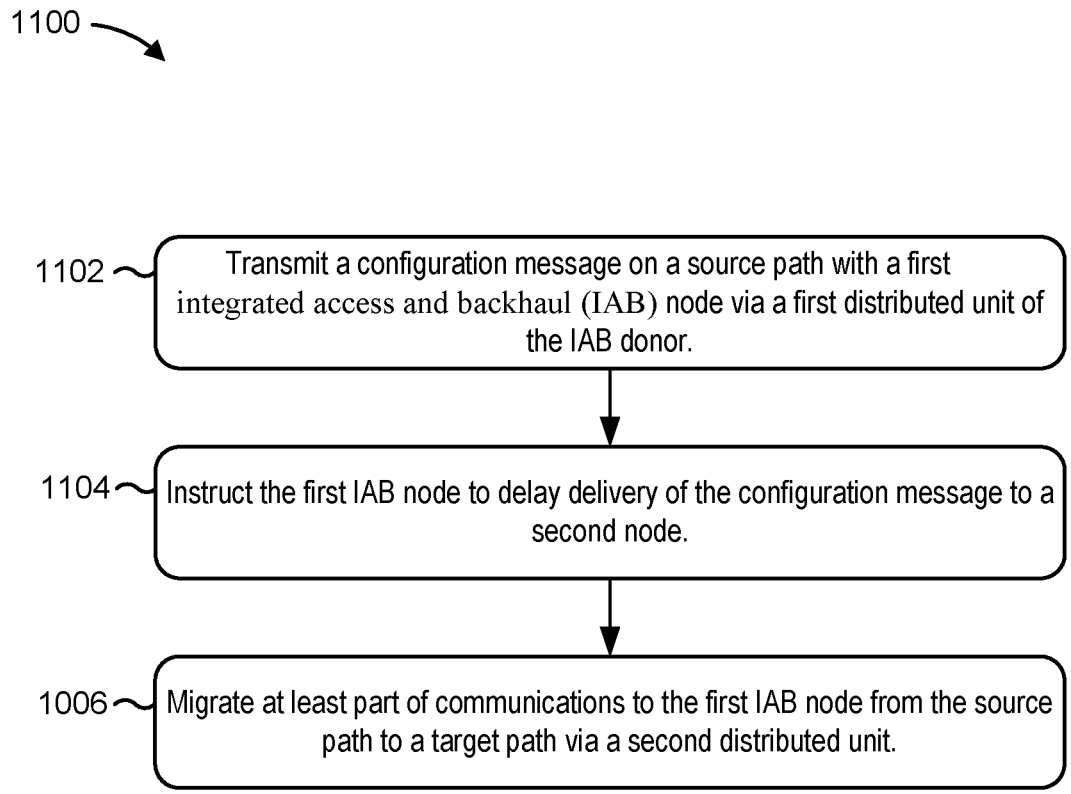
FIG. 11 is a flow diagram illustrating an example process performed, for example, by an integrated access and backhaul (IAB) donor, in accordance with various aspects of the present disclosure.

FIG. 11 is a flow diagram illustrating an example process 1100 performed, for example, at an integrated access and backhaul network (IAB) donor, in accordance with various aspects of the present disclosure. The example process 1100 is an example of a delayed delivery of a reconfiguration message in an integrated access and backhaul (IAB) network.

As shown in FIG. 11, in some aspects, the process 1100 may include transmitting a configuration message on a source path with a first IAB node via a first distributed unit of the IAB donor (block 1102). For example, the IAB donor (e.g., using the communication unit 294, controller/processor 290, and/or memory 292) may transmit a configuration message. Moreover, as described with reference to FIGS. 9 and 10, at time 91, the IAB donor (e.g., 904c) sends the configuration message to the migrating IAB node (also referred to as the first IAB node).

As shown in FIG. 11, in some aspects, the process 1100 may include instructing the first IAB node to delay delivery of the configuration message to a second node (block 1104). For example, the IAB donor (e.g., using the communication unit 294, controller/processor 290, and/or memory 292) may instruct the first IAB node to delay delivery. Additionally, as described with reference to FIGS. 9 and 10, the configuration message to the migrating IAB node (also referred to as the first IAB node) instructs the migrating IAB node (e.g., 906a) on the first signaling connection (over a source path) to postpone delivery of the configuration message to the child IAB node (e.g., 906b).

As shown in FIG. 11, in some aspects, the process 1100 may include migrating at least part of communications to the first IAB node from the source path with a target path via a second distributed unit (block 1106). For example, the IAB donor (e.g., using the communication unit 294, controller/processor 290, and/or memory 292) may migrate at least part of the communications. Furthermore, as described with reference to FIGS. 9 and 10, after releasing the configuration message to the child IAB node (e.g., 906b) at time 93, the migrating IAB node (e.g., 906a) completes the reconfiguration process with the IAB donor (e.g., 904) by sending an RRC Reconfiguration Complete message to the IAB donor CU 904c via the target path at time 94. The delivery of the configuration message may trigger a random access procedure, a security handshake, migration of the second signaling connection to a second path towards the donor CU (e.g., 904c), and migration of data tunnels terminated at the child IAB node (e.g., 906b) to a second path towards the donor CU (e.g., 904c).

Figure 12:
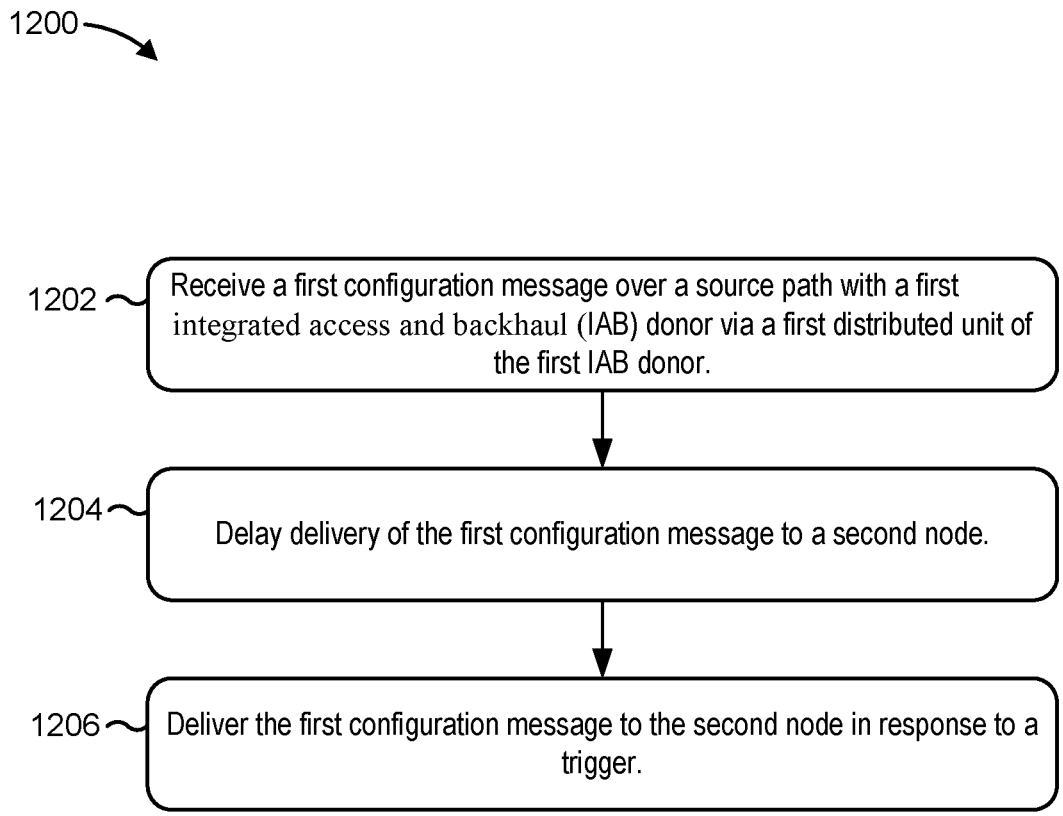
FIG. 12 is a flow diagram illustrating an example process performed, for example, by an integrated access and backhaul (IAB) node, in accordance with various aspects of the present disclosure.

FIG. 12 is a flow diagram illustrating an example process 1200 performed, for example, at a first integrated access and backhaul network (IAB) node, in accordance with various aspects of the present disclosure. The example process 1200 is an example of a delayed delivery of a reconfiguration message in an integrated access and backhaul (IAB) network.

As shown in FIG. 12, in some aspects, the process 1200 may include receiving a first configuration message over a source path to a first IAB donor via a first distributed unit of the first IAB donor (block 1202). For example, the IAB node (e.g., using the communication unit 294, controller/processor 290, and/or memory 292) may receive the first configuration message. As described with reference to FIGS. 9 and 10, the migrating IAB node (also referred to as the IAB node, e.g., 906a) receives the first configuration message from a first IAB donor (e.g., 904a) via a source path (e.g., first signaling connection) at time 91.

As shown in FIG. 12, in some aspects, the process 1200 may include delaying delivery of the first configuration message to a second node (block 1204). For example, the IAB node (e.g., using the communication unit 294, controller/processor 290, and/or memory 292) may delay delivery. As described with reference to FIGS. 9 and 10, the migrating IAB node (e.g., 906a) may withhold the configuration message until being triggered to release the message at time 93. In some aspects, the trigger to release the configuration message may be configured by the donor CU (e.g., 904c) on the first signaling connection. The instruction to trigger or configuration to trigger may be initiated by a parent of the migrating IAB node (e.g., via a medium access control-control element (MAC-CE) or downlink control information (DCI)). Further, in some aspects, the trigger may be an absolute time, a time elapsed, a relative time with respect to a RACH occasion detected by a migrating IAB node (e.g., 906a), a function of a RACH configuration detected by a migrating IAB node, or an execution of a reconfiguration with synchronization.

In some aspects, the trigger may be a reception of an RRC reconfiguration message. For example, as described with reference to FIG. 9, the trigger may occur when the migrating IAB node (e.g., 906a) receives a reconfiguration message carrying new IP information, BAP address information, or a reconfiguration with synchronization. The migrating IAB node (e.g., 906a) deduces a second path to the first donor CU (e.g., 904c) (or a second donor CU in case of an inter-CU migration) is now available. This is also true for the child IAB node (e.g., 906b), so the migrating IAB node (e.g., 906a) releases the configuration message.

In still further examples, the trigger may be based on reception of an indication from a parent of the migrating IAB node (e.g., via a MAC-CE or DCI). The trigger may also be in response to detecting a change in a first system information block (SIB1) message broadcast by a parent of the migrating IAB node. The SIB1 message carries a cell identifier, such as an NR cell global identity (NCGI). As such, the trigger may be detecting a change of a cell ID of a parent.

As shown in FIG. 12, in some aspects, the process 1200 may include delivering the first configuration message to the second node in response to a trigger (block 1206). For example, the IAB node (e.g., using the communication unit 294, controller/processor 290, and/or memory 292) may deliver the first configuration message. Moreover, as described with reference to FIGS. 9 and 10, the migrating IAB node 906a releases the configuration message to the child IAB node (e.g., 906b) at time 93.

Implementation examples are provided in the following numbered clauses.

1. A method for integrated access and backhaul network (IAB) node migration, performed at an IAB donor, comprising:
   transmitting a configuration message on a source path to a first IAB node via a first distributed unit of the IAB donor; and
   instructing the first IAB node to delay delivery of the configuration message to a second node.
2. The method of clause 1, in which the configuration message comprises a radio resource control (RRC) message providing an uplink (UL) mapping or an Internet Protocol (IP) address for the first IAB node to communicate with a target donor.
3. The method of any of clauses 1-2, further comprising migrating at least part of communications to the first IAB node from the source path to a target path for the first IAB node via a second distributed unit.
4. The method of any of clauses 1-3, further comprising:
   performing a first security handshake with the first IAB node; and
   performing a second security handshake with the second node, in which the second distributed unit is part of the IAB donor.
5. The method of any of clauses 1-4, wherein the second security handshake is performed concurrently with the first security handshake.
6. The method of any of clauses 1-5, in which the configuration message originates from a first donor central unit (CU) and carries a reconfiguration message of a second donor central unit.
7. The method of any of clauses 1-6, in which instructing the first IAB node to delay delivery comprises instructing delay of the configuration message based on a backhaul adaptation protocol (BAP) address, a BAP routing ID, a backhaul radio link control (RLC) channel ID, or a logical channel ID.
8. The method of any of clauses 1-7, further comprising configuring a trigger to release the configuration message.
9. The method of any of clauses 1-8, in which configuring the trigger comprises configuring for a specific child node.
10. The method of any of clauses 1-8, in which configuring the trigger comprises configuring for all child nodes.
11. The method of any of clauses 1-10, in which the trigger comprises an absolute time, a time duration, a relative time with respect to a random access channel (RACH) occasion detected by the first IAB node, or a function of a RACH configuration detected by the first IAB node.
12. The method of any of clauses 1-11, further comprising receiving an acknowledgment of the instructing.
13. The method of any of clauses 1-12, further comprising sending the configuration message to the first IAB node or an upstream node of the source path upon receiving the acknowledgement.
14. The method of clause any of clauses 1-13, further comprising receiving an acknowledgment of release of the configuration message.
15. The method of any of clauses 1-14, further comprising instructing the first IAB node to discard the configuration message in response to failure of the migrating the first IAB node or an upstream IAB node of the source path.

16. The method of any of clauses 1-15, further comprising instructing the second node to prevent a reconfiguration failure, a connection reestablishment, or a connection release.

17. A method for integrated access and backhaul network (IAB) node migration, performed at a first IAB node, comprising:
    receiving a first configuration message over a source path with a first IAB donor via a first distributed unit of the first IAB donor;
    delaying delivery of the first configuration message to a second node; and
    delivering the first configuration message to the second node in response to a trigger.

18. The method of clause 17, in which the trigger comprises receiving a reconfiguration message carrying internet protocol (IP) information or an uplink (UL) mapping.

19. The method of clause 17, in which the trigger comprises receiving an indication from a parent of the first IAB node to release the first configuration message.

20. The method of any of clauses 17-19, in which the trigger comprises detecting a change in a cell ID of a parent of the first IAB node.

21. The method of any of clauses 17-20, in which the detecting occurs based on a system information block (SIB) message broadcast by the parent of the first IAB node or a condition of a measurement of a cell ID broadcast by the parent of the first IAB node.

22. The method of clause 17, in which the trigger comprises a migration of a distributed unit (DU) of the first IAB node, including change of a system information block (SIB) message broadcast by the DU of the first IAB node.

23. The method of clause 17, in which the trigger comprises execution of a security handshake on a target path via a second distributed unit of the first IAB node.

24. The method of clause 23, in which the execution of the security handshake comprises establishment of an F1-C connection or setup of an F1-U data tunnel.

25. The method of clause 17, in which the trigger comprises executing a reconfiguration with synchronization based on the first configuration message from or forwarded by the first IAB donor.

26. The method of any of clauses 23-25, in which the executing the reconfiguration with synchronization comprises a handover procedure.

27. The method of any of clauses 17-26, further comprising receiving the trigger on the source path.

28. The method of any of clauses 17-27, further comprising instructing a child IAB node to release a second configuration message in response to delivering the first configuration message.

29. The method of any of clauses 17-28, further comprising:
    instructing a child IAB node to discard a second configuration message withheld at a child node; and
    initiating concurrent procedures towards the first IAB donor in response to delivering the first configuration message to the second node, the concurrent procedures comprising security handshakes.

30. The method of any of clauses 17-29, further comprising participating in concurrent procedures with the second node or another node of a path comprising the first IAB node and the second node towards the first IAB donor or a second IAB donor node in response to delivering the first configuration message to the second node.

31. An apparatus for wireless communications by an integrated access and backhaul network (IAB) donor, comprising:
    a processor,
    a memory coupled with the processor; and
    instructions stored in the memory and operable, when executed by the processor, to cause the apparatus:
        to transmit a configuration message on a source path with a first IAB node via a first distributed unit of the IAB donor;
        to instruct the first IAB node to delay delivery of the configuration message to a second node; and
        to migrate at least part of communications to the first IAB node from the source path to a target path via a second distributed unit.

32. The apparatus of clause 31, in which the processor causes the apparatus:
    to perform a first security handshake with the first IAB node; and
    to perform a second security handshake with the second node, in which the second distributed unit is part of the IAB donor.

33. The apparatus of any of clauses 31-32, in which the processor causes performing the second security handshake concurrently with the first security handshake.

34. The apparatus of any of clauses 31-33, in which the configuration message originates from a first donor central unit (CU) and carries a reconfiguration message of a second donor central unit.

35. The apparatus of any of clauses 31-34, in which the processor causes the apparatus to instruct delay of the configuration message based on a backhaul adaptation protocol (BAP) address, a BAP routing ID, a backhaul radio link control (RLC) channel ID, or a logical channel ID.

36. The apparatus of any of clauses 31-35, in which the processor causes the apparatus to configure a trigger to release the configuration message.

37. The apparatus of any of clauses 31-36, in which the processor causes the apparatus to configure the trigger for a specific child node.

38. The apparatus of any of clauses 31-37, in which the processor causes the apparatus to configure the trigger for all child nodes.

39. The apparatus of any of clauses 31-38, in which the trigger comprises an absolute time, a time duration, a relative time with respect to a random access channel (RACH) occasion detected by the first IAB node, or a function of a RACH configuration detected by the first IAB node.

40. The apparatus of any of clauses 31-39, in which the processor causes the apparatus to receive a reconfiguration message carrying IP (internet protocol) information or a default uplink (UL) mapping.

41. The apparatus of any of clauses 31-40, in which the processor causes the apparatus to configure the trigger via the source path.

42. The apparatus of any of clauses 31-41, in which the processor causes the apparatus to receive an acknowledgment of the instructing.

43. The apparatus of any of clauses 31-42, in which the processor causes the apparatus to send the configuration message to the first IAB node or another node of a path comprising the first IAB node and the second node upon receiving the acknowledgement.

44. The apparatus of any of clauses 31-43, in which the processor causes the apparatus to receive an acknowledgment of release of the configuration message.

45. The apparatus of any of clauses 31-44, in which the processor causes the apparatus to instruct the first IAB node to discard the configuration message in response to failure of the migrating at the first IAB node or an upstream node of the source path.

46. The apparatus of any of clauses 31-45, in which the processor causes the apparatus to instruct the second node to prevent a reconfiguration failure, a connection reestablishment, or a connection release.

47. The apparatus of any of clauses 31-46, in which the first IAB node comprises a first IAB node and the second node comprises a second IAB node.

48. An apparatus for wireless communications by an integrated access and backhaul network (IAB) donor, comprising:
a processor,
a memory coupled with the processor; and
instructions stored in the memory and operable, when executed by the processor, to cause the apparatus:
to receive a first configuration message over a source path with a first IAB donor via a first distributed unit of the first IAB donor;
to delay delivery of the first configuration message to a second node; and
to deliver the first configuration message to the second node in response to a trigger.

49. The apparatus of clause 48, in which the processor causes the apparatus to configure the trigger via downlink control information (DCI) or a media access control-control element (MAC-CE).

50. The apparatus of any of clauses 48-49, in which the processor causes the apparatus to receive an indication from a parent of the first IAB node via downlink control information (DCI) or a media access control-control element (MAC-CE).

51. The apparatus of any of clauses 48-50, in which the processor causes the apparatus to detect a change in a cell ID of a parent of the first IAB node.

52. The apparatus of any of clauses 48-51, in which detecting occurs based on a system information block (SIB) message broadcast by the parent of the first IAB node or a condition of a measurement of a cell ID broadcast by the parent of the first IAB node.

53. The apparatus of any of clauses 48-52, in which the trigger comprises a switch of a distributed unit (DU) of the first IAB node, including change of a system information block (SIB) message broadcast by the DU of the first IAB node.

54. The apparatus of any of clauses 48-52, in which the trigger comprises execution of a security handshake on a target path via a second distributed unit of the first IAB node.

55. The apparatus of any of clauses 48-54, in which execution of the security handshake comprises establishment of an F1-C connection or setup of an F1-U data tunnel.

56. The apparatus of any of clauses 48-55, in which the processor causes the apparatus to execute a reconfiguration with synchronization based on the first configuration message from or forwarded by the first IAB donor.

57. The apparatus of any of clauses 48-56, in which the processor causes the apparatus to execute the reconfiguration with synchronization comprises a handover procedure.

58. The apparatus of any of clauses 48-57, in which the processor causes the apparatus to receive the trigger on the source path.

59. The apparatus of any of clauses 48-58, in which the processor causes the apparatus to instruct a child IAB node to release a second configuration message in response to delivering the first configuration message.

60. The apparatus of any of clauses 48-59, in which the processor causes the apparatus to instruct a child IAB node to discard a second configuration message withheld at a child node.

61. The apparatus of any of clauses 48-60, in which the processor causes the apparatus to initiate concurrent procedures towards the first IAB donor in response to delivering the first configuration message to the second node.

62. The apparatus of any of clauses 48-61, in which the concurrent procedures comprise security handshakes.

63. The apparatus of any of clauses 48-62, in which the processor causes the apparatus to participate in concurrent procedures with the second node or another node of a path comprising the first IAB node and the second node towards the first IAB donor or a second IAB donor node in response to delivering the first configuration message to the second node.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods are described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c"

is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for integrated access and backhaul network (IAB) node migration, performed at an IAB donor, comprising:
    transmitting a configuration message on a source path to a first IAB node via a first distributed unit of the IAB donor, the configuration message comprising a radio resource control RRC) message providing an uplink (UL) mapping or an Internet Protocol (IP) address for communicating with a target donor; and
    instructing the first IAB node to delay delivery of the configuration message to a second node.

2. The method of claim 1, further comprising migrating at least part of communications to the first IAB node from the source path to a target path for the first IAB node via a second distributed unit.

3. The method of claim 2, further comprising:
    performing a first security handshake with the first IAB node; and
    performing a second security handshake with the second node, in which the second distributed unit is part of the IAB donor.

4. The method of claim 3, wherein the second security handshake is performed concurrently with the first security handshake.

5. The method of claim 1, in which the configuration message originates from a first donor central unit (CU) and carries a reconfiguration message of a second donor central unit.

6. The method of claim 1, in which instructing the first IAB node to delay delivery comprises instructing delay of the configuration message based on a backhaul adaptation protocol (BAP) address, a BAP routing ID, a backhaul radio link control (RLC) channel ID, or a logical channel ID.

7. The method of claim 1, further comprising configuring a trigger to release the configuration message.

8. The method of claim 7, in which configuring the trigger comprises configuring for a specific child node.

9. The method of claim 7, in which configuring the trigger comprises configuring for all child nodes.

10. The method of claim 7, in which the trigger comprises an absolute time, a time duration, a relative time with respect to a random access channel (RACH) occasion detected by the first IAB node, or a function of a RACH configuration detected by the first IAB node.

11. The method of claim 1, further comprising receiving an acknowledgment of the instructing.

12. The method of claim 11, further comprising sending the configuration message to the first IAB node or an upstream node of the source path upon receiving the acknowledgement.

13. The method of claim 1, further comprising receiving an acknowledgment of release of the configuration message.

14. The method of claim 1, further comprising instructing the first IAB node to discard the configuration message in response to failure of the migrating the first IAB node or an upstream IAB node of the source path.

15. The method of claim 1, further comprising instructing the second node to configure a timer to prevent a reconfiguration failure, a connection reestablishment, or a connection release.

16. A method for integrated access and backhaul network (IAB) node migration, performed at a first IAB node, comprising:
    receiving a first configuration message over a source path with a first IAB donor via a first distributed unit of the first IAB donor;
    delaying delivery of the first configuration message to a second node;
    delivering the first configuration message to the second node in response to a trigger; and
    participating in the at least one concurrent procedure with the second node or another node of a path comprising the first IAB node and the second node towards the first IAB donor or a second IAB donor node in response to delivering the first configuration message to the second node.

17. The method of claim 16, in which the trigger comprises receiving a reconfiguration message carrying internet protocol (IP) information or an uplink (UL) mapping.

18. The method of claim 16, in which the trigger comprises receiving an indication from a parent of the first IAB node to release the first configuration message.

19. The method of claim 16, in which the trigger comprises detecting a change in a cell ID of a parent of the first IAB node.

20. The method of claim 19, in which the detecting occurs based on a system information block (SIB) message broadcast by the parent of the first IAB node or a condition of a measurement of a cell ID broadcast by the parent of the first IAB node.

21. The method of claim 16, in which the trigger comprises a migration of a distributed unit (DU) of the first IAB node, including change of a system information block (SIB) message broadcast by the DU of the first IAB node.

22. The method of claim 16, in which the trigger comprises execution of a security handshake on a target path via a second distributed unit of the first IAB node.

23. The method of claim 22, in which the execution of the security handshake comprises establishment of an F1-C connection or setup of an F1-U data tunnel.

24. The method of claim 16, in which the trigger comprises executing a reconfiguration with synchronization based on the first configuration message from or forwarded by the first IAB donor.

25. The method of claim 24, in which the executing the reconfiguration with synchronization comprises a handover procedure.

26. The method of claim 16, further comprising receiving the trigger on the source path.

27. The method of claim 16, further comprising instructing a child IAB node to release a second configuration message in response to delivering the first configuration message.

28. The method of claim 16, further comprising:
   instructing a child IAB node to discard a second configuration message withheld at a child node; and
   initiating the at least one concurrent procedure towards the first IAB donor in response to delivering the first configuration message to the second node, the at least one concurrent procedure comprising at least one security handshake.

29. An apparatus for wireless communications by an integrated access and backhaul network (IAB) donor, comprising:
   at least one processor,
   at least one memory unit coupled with the at least one processor; and
   instructions stored in the at least one memory unit and operable, when executed by the at least one processor, to cause the apparatus:
      to transmit a configuration message on a source path with a first IAB node via a first distributed unit of the IAB donor, the configuration message comprising a radio resource control (RRC) message providing an uplink (UL) mapping or an Internet Protocol (IP) address for communicating with a target donor; and
      to instruct the first IAB node to delay delivery of the configuration message to a second node.

30. The apparatus of claim 29, in which the at least one processor causes the apparatus to migrate at least part of communications to the first IAB node from the source path to a target path via a second distributed unit.

31. The apparatus of claim 30, in which the at least one processor causes the apparatus:
   to perform a first security handshake with the first IAB node; and
   to perform a second security handshake with the second node, in which the second distributed unit is part of the IAB donor.

32. The apparatus of claim 31, in which the at least one processor causes performing the second security handshake at least partially in concurrent with the first security handshake.

33. The apparatus of claim 29, in which the configuration message originates from a first donor central unit (CU) and carries a reconfiguration message of a second donor central unit.

34. The apparatus of claim 29, in which the at least one processor causes the apparatus to instruct delay of the configuration message based on a backhaul adaptation protocol (BAP) address, a BAP routing ID, a backhaul radio link control (RLC) channel ID, or a logical channel ID.

35. The apparatus of claim 29, in which the at least one processor causes the apparatus to configure a trigger to release the configuration message.

36. The apparatus of claim 35, in which the at least one processor causes the apparatus to configure the trigger for a specific child node.

37. The apparatus of claim 36, in which the at least one processor causes the apparatus to configure the trigger for all child nodes.

38. The apparatus of claim 36, in which the trigger comprises an absolute time, a time duration, a relative time with respect to a random access channel (RACH) occasion detected by the first IAB node, or a function of a RACH configuration detected by the first IAB node.

39. The apparatus of claim 36, in which the at least one processor causes the apparatus to receive a reconfiguration message carrying IP (internet protocol) information or a default uplink (UL) mapping.

40. The apparatus of claim 36, in which the at least one processor causes the apparatus to configure the trigger via the source path.

41. The apparatus of claim 29, in which the at least one processor causes the apparatus to receive an acknowledgment of the instructing.

42. The apparatus of claim 41, in which the at least one processor causes the apparatus to send the configuration message to the first IAB node or another node of a path comprising the first IAB node and the second node upon receiving the acknowledgement.

43. The apparatus of claim 29, in which the at least one processor causes the apparatus to receive an acknowledgment of release of the configuration message.

44. The apparatus of claim 29, in which the at least one processor causes the apparatus to instruct the first IAB node to discard the configuration message in response to failure of the migrating at the first IAB node or an upstream node of the source path.

45. The apparatus of claim 29, in which the at least one processor causes the apparatus to instruct the second node to prevent a reconfiguration failure, a connection reestablishment, or a connection release.

46. The apparatus of claim 29, in which the second node comprises a second IAB node.

47. An apparatus for wireless communications by an integrated access and backhaul network (IAB) donor, comprising:
   at least one processor,
   at least one memory unit coupled with the at least one processor; and
   instructions stored in the at least one memory unit and operable, when executed by the at least one processor, to cause the apparatus:
      to receive a first configuration message over a source path with a first IAB donor via a first distributed unit of the first IAB donor;
      to delay delivery of the first configuration message to a second node;
      to deliver the first configuration message to the second node in response to a trigger; and
      to participate in the at least one concurrent procedure with the second node or another node of a path comprising the first IAB node and the second node towards the first IAB donor or a second IAB donor node in response to delivering the first configuration message to the second node.

48. The apparatus of claim 47, in which the at least one processor causes the apparatus to configure the trigger via downlink control information (DCI) or a media access control-control element (MAC-CE).

49. The apparatus of claim 48, in which the at least one processor causes the apparatus to receive an indication from a parent of the first IAB node via downlink control information (DCI) or a media access control-control element (MAC-CE).

50. The apparatus of claim 47, in which the at least one processor causes the apparatus to detect a change in a cell ID of a parent of the first IAB node.

51. The apparatus of claim 50, in which detecting occurs based on a system information block (SIB) message broadcast by the parent of the first IAB node or a condition of a measurement of a cell ID broadcast by the parent of the first IAB node.

52. The apparatus of claim 47, in which the trigger comprises a switch of a distributed unit (DU) of the first IAB node, including change of a system information block (SIB) message broadcast by the DU of the first IAB node.

53. The apparatus of claim 47, in which the trigger comprises execution of a security handshake on a target path via a second distributed unit of the first IAB node.

54. The apparatus of claim 53, in which execution of the security handshake comprises establishment of an F1-C connection or setup of an F1-U data tunnel.

55. The apparatus of claim 47, in which the at least one processor causes the apparatus to execute a reconfiguration with synchronization based on the first configuration message from or forwarded by the first IAB donor.

56. The apparatus of claim 55, in which the at least one processor causes the apparatus to execute the reconfiguration with synchronization comprises a handover procedure.

57. The apparatus of claim 47, in which the at least one processor causes the apparatus to receive the trigger on the source path.

58. The apparatus of claim 47, in which the at least one processor causes the apparatus to instruct a child IAB node to release a second configuration message in response to delivering the first configuration message.

59. The apparatus of claim 47, in which the at least one processor causes the apparatus to instruct a child IAB node to discard a second configuration message withheld at a child node.

60. The apparatus of claim 47, in which the at least one processor causes the apparatus to initiate concurrent procedures towards the first IAB donor in response to delivering the first configuration message to the second node.

61. The apparatus of claim 60, in which the at least one concurrent procedure comprises at least one security handshake.

* * * * *